US009363231B2

(12) United States Patent
Force et al.

(10) Patent No.: US 9,363,231 B2
(45) Date of Patent: Jun. 7, 2016

(54) SYSTEM AND METHOD FOR MONITORING NETWORK COMMUNICATIONS ORIGINATING IN MONITORED JURISDICTIONS

(75) Inventors: Paul Force, Morton, IL (US); Anthony Crumb, Canton, IL (US); James Hutson, Chillicothe, IL (US); Steven Cox, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1298 days.

(21) Appl. No.: 11/900,933

(22) Filed: Sep. 13, 2007

(65) Prior Publication Data

US 2009/0077227 A1   Mar. 19, 2009

(51) Int. Cl.
  *G06F 15/173*   (2006.01)
  *H04L 29/06*   (2006.01)

(52) U.S. Cl.
  CPC ............ *H04L 63/00* (2013.01); *H04L 63/30* (2013.01); *H04L 63/304* (2013.01); *H04L 63/306* (2013.01)

(58) Field of Classification Search
  CPC ...... H04L 63/30; H04L 63/304; H04L 63/306
  USPC .................................................. 709/224, 206
  See application file for complete search history.

(56) References Cited

U.S. PATENT DOCUMENTS

| | | | |
|---|---|---|---|
| 6,226,498 B1 * | 5/2001 | Tschorn et al. | 455/67.11 |
| 6,453,345 B2 * | 9/2002 | Trcka et al. | 709/224 |
| 6,460,074 B1 * | 10/2002 | Fishkin | 709/206 |
| 6,643,688 B1 | 11/2003 | Fuisz | |
| 7,003,555 B1 | 2/2006 | Jungck | |
| 7,155,484 B2 * | 12/2006 | Malik | 709/206 |
| 7,257,630 B2 * | 8/2007 | Cole et al. | 709/224 |
| 7,558,832 B2 * | 7/2009 | Rounthwaite et al. | 709/206 |
| 2004/0054926 A1 * | 3/2004 | Ocepek et al. | 713/201 |
| 2004/0225645 A1 | 11/2004 | Rowney et al. | |
| 2005/0027723 A1 * | 2/2005 | Jones et al. | 707/100 |
| 2005/0086252 A1 | 4/2005 | Jones et al. | |
| 2006/0031942 A1 * | 2/2006 | Jones et al. | 726/27 |
| 2006/0069697 A1 * | 3/2006 | Shraim et al. | 707/102 |
| 2006/0101515 A1 * | 5/2006 | Amoroso et al. | 726/23 |
| 2006/0184549 A1 | 8/2006 | Rowney et al. | |
| 2006/0224589 A1 * | 10/2006 | Rowney et al. | 707/9 |
| 2007/0061451 A1 * | 3/2007 | Villado et al. | 709/224 |
| 2008/0034425 A1 * | 2/2008 | Overcash et al. | 726/22 |
| 2008/0114838 A1 * | 5/2008 | Taylor | 709/206 |
| 2009/0070866 A1 * | 3/2009 | Erikson | 726/14 |

* cited by examiner

*Primary Examiner* — Krista Zele
*Assistant Examiner* — James Forman
(74) *Attorney, Agent, or Firm* — Miller, Matthias & Hull LLP

(57) ABSTRACT

A method of monitoring network communications originating in monitored jurisdictions includes a step of identifying a monitored jurisdiction within a computer network based on predetermined criteria. The computer network includes at least one monitored jurisdiction and at least one unmonitored jurisdiction. A database is queried to identify at least one communication identifier associated with the monitored jurisdiction. The method also includes a step of storing a list including the at least one communication identifier. Only network communication having communication identifiers included in the list are monitored.

19 Claims, 3 Drawing Sheets

Figure 1:
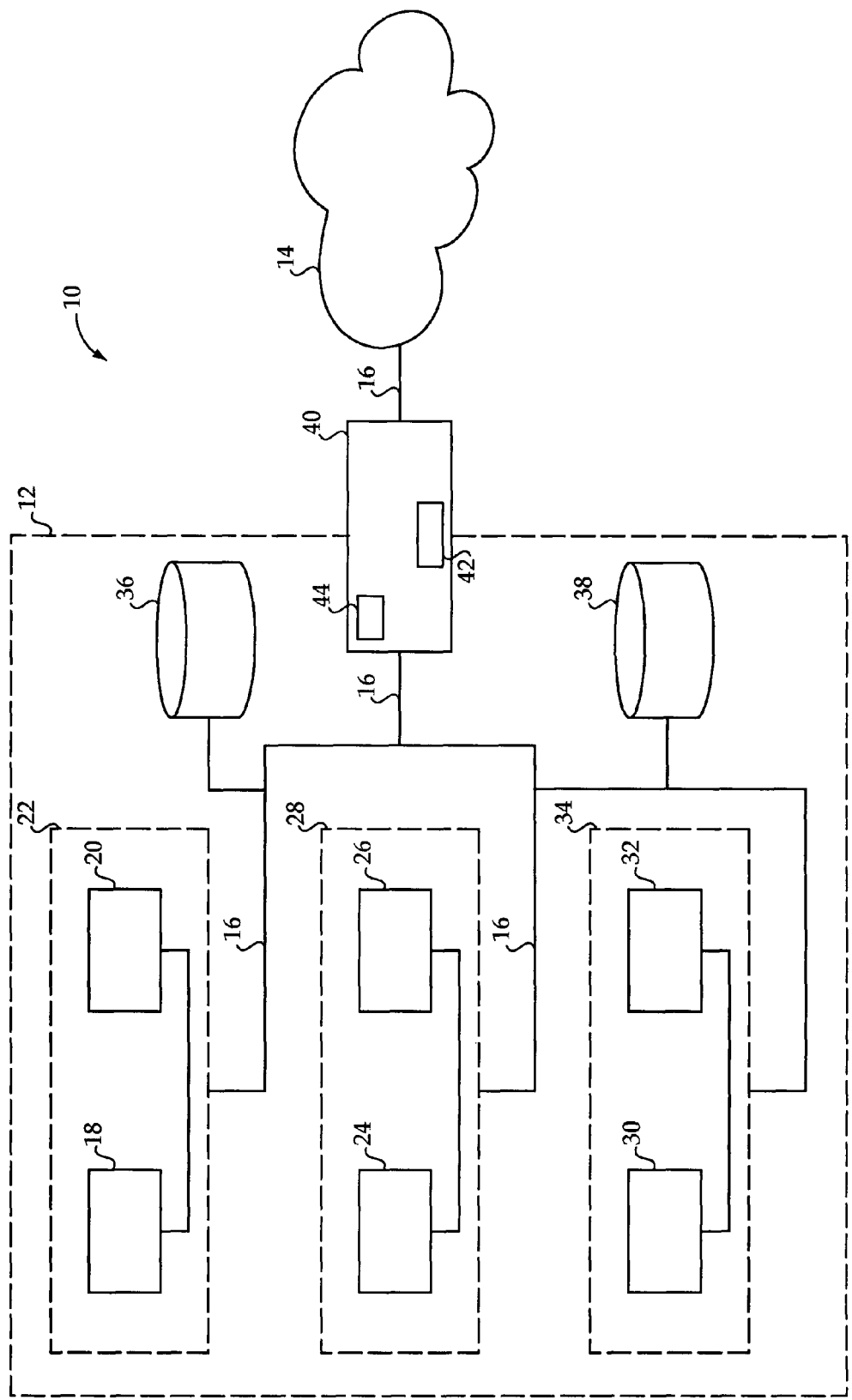

SYSTEM AND METHOD FOR MONITORING NETWORK COMMUNICATIONS ORIGINATING IN MONITORED JURISDICTIONS

TECHNICAL FIELD

The present disclosure relates generally to monitoring network communications, and more particularly to monitoring only network communications originating in monitored jurisdictions.

BACKGROUND

Monitoring software is well known for gathering information from a computer network and/or improving the security of a computer network. Specifically, software may be provided that monitors all network communications coming into and going out of a network. A network event may be identified, based on user defined parameters, and a relevant action may be taken in response to the identified event. Typical network events, for example, may include violations of a security policy, or may be related to email use, Internet use, document management, or software use or compliance.

Increasingly, computer networks interconnect numerous devices and span regional, national, or even global areas. Although it may be desirable to keep such a regional or global network secure, there may not be a legal right to do so. Restrictions that could make monitoring improper can come from many sources, including laws, privacy or employment policies, terms-of-service agreements, and other contracts that govern the different physical locations, or jurisdictions, of the network. Violating these restrictions could lead to negative publicity, civil liability, and even criminal sanctions.

A method of determining the origin of a communication, such as a network communication, is described in U.S. Pat. No. 7,155,484. Specifically, the originating IP address of an incoming email is determined and compared to a list of overseas IP addresses. If the originating IP address is an overseas IP address and, therefore, deemed undesirable, specific content of the incoming email is extracted or the email is deleted entirely. Although this method provides a means for determining the origin of specific communications, namely email messages, it does not contemplate determining the origin of all network communications and, thereafter, monitoring only network communications originating from monitored jurisdictions.

The present disclosure is directed to one or more of the problems set forth above.

SUMMARY OF THE DISCLOSURE

In one aspect, a method of monitoring network communications originating in a monitored jurisdiction includes a step of identifying a monitored jurisdiction within a computer network based on predetermined criteria. The computer network includes at least one monitored jurisdiction and at least one unmonitored jurisdiction. A database is queried to identify at least one communication identifier associated with the monitored jurisdiction. The method also includes a step of storing a list including the at least one communication identifier. Only network communication having communication identifiers included in the list are monitored.

In another aspect, a system for monitoring network communications originating in a monitored jurisdiction includes a computer network with portions located in at least one monitored jurisdiction and at least one unmonitored jurisdiction. The monitored jurisdiction is identified based on predetermined criteria. The system also includes at least one database having at least one communication identifier associated with the monitored jurisdiction. A process stores a list including the at least one communication identifier. A monitoring tool monitors only network communications having communication identifiers included in the list.

BRIEF DESCRIPTION OF THE DRAWINGS

FIG. 1 is a block diagram of a system according to the present disclosure;

FIG. 2 is an exemplary list of communication identifiers corresponding to monitored jurisdictions of the system of FIG. 1; and FIG. 3 is a flow chart of one embodiment of a method of monitoring network communications originating from a monitored jurisdiction.

DETAILED DESCRIPTION

An exemplary embodiment of a system 10 for monitoring network communications is shown generally in FIG. 1. The system 10 may be a computer network including one or more sources in communication with one or more additional sources. For example, the system 10 may include a computer network 12, such as a private or protected network, in communication with an external source or outside network 14, such as, for example, the Internet, via a monitored pathway or one or more communication lines 16, which may include one or more wireless segments. The network 12 and outside network 14 may each be of any variety of networks, such as corporate intranets, home networking environments, local area networks, and wide area networks, among others, and may include wired and/or wireless connections. Further, any of the known protocols, such as, for example, TCP/IP, NetBEUI, or HTTP, may be implemented to facilitate network communications.

Computers having processors and memories are distributed throughout the network 12, as is well known in the art. Also connected to the network 12 may be printers, scanners, facsimile machines, servers, databases, and the like. Although specific examples are given, it should be appreciated that the network 12 may include any addressable device, system, router, gateway, subnetwork, or other similar device or structure. It should also be appreciated that, although specific and limited examples are given, the network 12 may be of any known topology and may include an unlimited number of devices.

The computer network 12 may include network devices 18 and 20 at a first jurisdiction, or location, 22 that communicate via the communication lines 16. Additional network devices, such as devices 24 and 26 comprising a second jurisdiction 28 and devices 30 and 32 comprising a third jurisdiction 34, may also communicate via the communication lines 16. It should be appreciated that each of the first, second, and third jurisdictions 22, 28, and 34, respectively, may include a subnetwork representing network devices at a distinct territory over which a governing body has legal power or authority. Each jurisdiction 22, 28, and 34 may, therefore, include one geographic location, such as, for example, a county, province, state, nation, country, or even a governed ship or plane in international space. However, each jurisdiction 22, 28, and 34 may represent any logical or desirable grouping of network devices.

The network devices 18, 20, 24, 26, 30, and 32, as described above, may include any common network devices, such as, for example, computers having processors and memories, printers, scanners, facsimile machines, servers, and the like. Computer network 12 may also include a first database, such as a subnetwork database 36, and a second database, such as a contact database 38, connected to the computer network 12 via communication conduits 16. Although specific examples are given of network devices 18, 20, 24, 26, 30, and 32 and databases 36 and 38, it should be appreciated that the computer network 12, and first, second, and third jurisdictions 22, 28, and 34, may include any number and type of addressable devices.

Each of the network devices 18, 20, 24, 26, 30, and 32, and any other participating network devices, may be dynamically assigned a network address that it uses to identify and communicate with various other devices of the computer network 12 and any outside devices or networks. An exemplary network address includes an Internet protocol (IP) address for networks utilizing the IP communication protocol. Typically, one of the network devices 18, 20, 24, 26, 30, and 32 broadcasts a request to a service provider of the computer network 12 for a network address. A unique network address is, in turn, assigned, and the network device 18, 20, 24, 26, 30, and 32 configures itself to use that network address. If, however, the network device 18, 20, 24, 26, 30, and 32 is not continuously connected to the computer network 12, the network address will be surrendered and may be reused by an other network device. Although dynamically assigned network addresses are described, it should be appreciated that static network addresses are also contemplated.

The subnetwork database 36 may include information that maps each jurisdiction, or location, of computer network 12 to a range of network addresses that may be assigned to the network devices of that jurisdiction. For example, first jurisdiction 22 may be referenced by an identifier, such as "FIRST_JURISDICTION" and may be mapped to a range of network addresses that have been allocated for use by first jurisdiction 22, such as IP addresses 192.168.0.1-192.168.0.10. Second jurisdiction 28 may be identified as "SECOND_JURISDICTION," and may be mapped to a range of IP addresses, such as IP addresses 192.168.0.11-192.168.0.20. Similarly, third jurisdiction 34 may be identified as "THIRD_JURISDICTION," and may be mapped to IP addresses 192.168.0.21-192.168.0.30. Using subnetwork database 36 as a reference, it can be determined that a network device using IP address 192.168.0.4 belongs to "FIRST_JURISDICTION" or, more specifically, first jurisdiction 22. The network device could, for example, be network device 18 or network device 20, or any other network device of first jurisdiction 22.

The contact database 38 may include contact information for all users of the network 12. This contact information may include information relating to a user identity, such as, for example, a full name of an individual, home address, phone number, email address, contact information, and various other information. In addition, this contact information may map a specific contact or user to a specific jurisdiction or location of the network 12. For example, "John Smith" may be a contact or user of network 12, such as an employee, working at first jurisdiction 22. A record may exist within the contact database 38 that maps specific contact information to "John Smith." Such contact information may include, for example, an address, such as "123 Maple Drive, Chicago, Ill., 54321," a phone number, such as "123-456-7890," and an email address, such as "jsmith@network12.com." In addition, the record for "John Smith" may be mapped to "FIRST_JURISDICTION."

Similarly, "Mary Jones" may be a contact or user of network 12, such as an employee, working at second jurisdiction 28. A record may exist within the contact database 38 that maps specific contact information to "Mary Jones." Such contact information may include, for example, an address, such as "456 Walnut Avenue, New York, N.Y., 12345," a phone number, such as "888-555-1212," and an email address, such as "mjones@network12.com." Additionally, the record for "Mary Jones" may be mapped to "SECOND_JURISDICTION." Therefore, given the email address of "mjones@network12.com, it may be determined, using the contact database 38, that the user of the specified email, "Mary Jones," is a user at "SECOND_JURISDICTION" or, more specifically, second jurisdiction 28. It should be appreciated that the designated contact information may, alternatively, be stored in subnetwork database 36, or any other data repository. It should also be appreciated that subnetwork database 36 and contact database 38 may include any data model for organizing data and may utilize any database management hardware or software, as is well known in the art.

The computer network 12 also includes a monitoring tool 40 for monitoring communications within the network 12. For example, the monitoring tool 40 may be disposed to monitor communications between the network 12 and the outside network 14. It should be appreciated that the monitoring tool 40 may be disposed to monitor any one or more of the plurality of communication lines 16. The monitoring tool 40 may include any necessary monitoring hardware and/or software. The monitoring software may be executed on a server, workstation, or other machine or device. The monitoring tool 40 may scan all outgoing and/or incoming communications, such as, for example, email (messages and/or attached documents), instant messages, web postings, file transfers, voice over internet, and others, to detect a network communication event, such as, for example, a violation of a security policy. Other communication events may include, but are not limited to, events relating to email use, Internet use, document management, and software use or compliance.

It may be desirable for the network 12 to electronically monitor network user compliance with a network security policy stored in a database, such as subnetwork database 36, contact database 38, or any other data repository. Specifically, it may be desirable to make sure all outgoing communications comply with the security policy of the network 12 and that confidential data is not lost. Such communications monitoring software or, more specifically, data loss prevention software may be provided by Vontu® of San Francisco, Calif. Although a specific example is given, it should be appreciated that a variety of monitoring tools are commercially available.

Rules governing use and security within the network 12 may be articulated and stored in the subnetwork database 36, contact database 38, or any other database or repository. The monitoring tool 40 may apply and compare the articulated rules to communications leaving the network 12 to make a decision whether an activity, a pattern of activity, or a specific communication content reflects a network communication event. Each communication event may be categorized, ranging from a mild event to a severe event, and may trigger an automated action based on the category of the event or the number of events that have been detected. Exemplary actions may include recording the information in a log file, preventing transfer of the communication, extracting content of the communication that triggered the event, encrypting the communication, notifying an administrator of the network 12, notifying the owner of the communication, or any other action deemed desirable.

Figure 2:
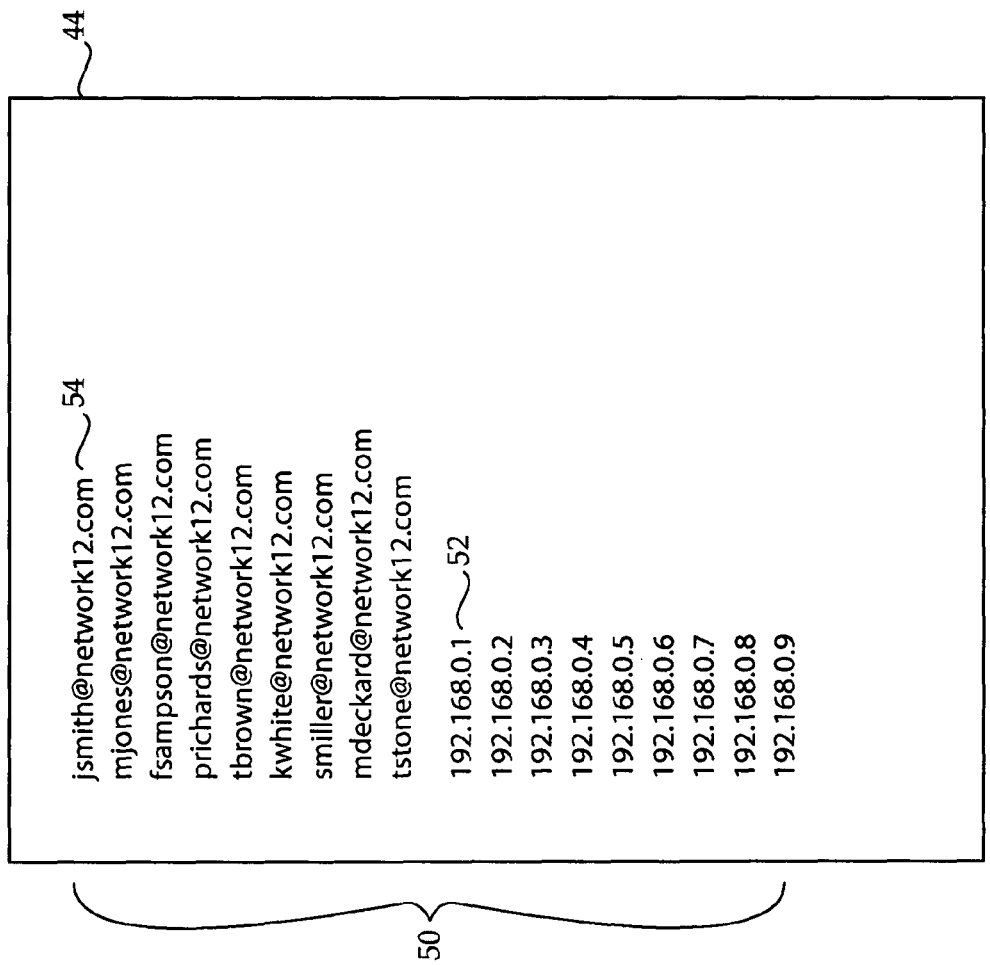

A process 42 may be executed on the same server, workstation, or other device as the monitoring tool 40 and may create and/or provide a list 44. The list 44, as shown in FIG. 2, may identify one or more communication identifiers 50 corresponding to monitored jurisdictions. For example, it may be desirable to monitor incoming and outgoing communications from only specified jurisdictions or locations. Specifically, it may be desirable to monitor outgoing and/or incoming communications of first jurisdiction 22. Once first jurisdiction 22 has been identified as a monitored jurisdiction, process 42 may create the list 44 by referencing at least one of or both databases 36 and 38. It may be desirable to reference subnetwork database 36 to select communication identifiers 50 associated with first jurisdiction 22. Communication identifiers 50, according to this example, may include network addresses, such as IP address 52. It may also be desirable to reference contact database 38 to select communication identifiers 50 associated with first jurisdiction 22. Communication identifiers 50 from contact database 38 may include email addresses, such as email address 54. It should be appreciated that communication identifiers 50 may include any identifying information that may associate a communication with a specific jurisdiction, such as first jurisdiction 22, of the network 12. It should also be appreciated that only one type of communication identifiers 50, such as IP address 52 or, alternatively, email address 54, may be used, or a combination of these or several other types of communication identifiers may be used.

The list 44 may be stored and used by monitoring tool 40 to determine which network communications to monitor. If, for example, an email communication is identified with a sender of "jsmith@network12.com," it can be determined, by referencing the list 44, that the communication originated from a monitored jurisdiction, namely, first jurisdiction 22. If, however, an email communication is identified with a sender of "mjones@network12.com," it can be determined that, according to the current example, the communication originated from an unmonitored jurisdiction, since the communication identifier 50 is not included in the list 44. For a non-email based network communication, such as a file transfer, it may be desirable to determine if the associated IP address is included in the list 44 to determine whether or not to monitor the communication. These, and other similar communications, may be referred to as network address based communications. It should be appreciated that typical network traffic includes a variety of communications that may each include one or more indications of where the network communication originated.

The process 42 may be executed to initially create the list 44 and may be continually used thereafter to update the list 44. For example, it may be desirable to update the list 44 to reflect new contacts or users of the network 12, changes in jurisdiction for a given user, and any additional reconfigurations and/or modifications of the network 12. For these reasons, it may be desirable to execute the process 42 on a daily basis, or any other desired frequency. It should be appreciated by those skilled in the art that, although specific examples are given, any application, utility, or tool may be used to achieve the goals identified above.

INDUSTRIAL APPLICABILITY

Referring to FIGS. 1 and 2, an exemplary embodiment of a system 10 for monitoring network communications is shown generally in FIG. 1. The system 10 may include a network 12, such as a private or protected network, in communication with an external source or network 14 via a monitored pathway, such as communication lines 16. The computer network 12 may include network devices 18 and 20 at a first jurisdiction 22 that communicate via the communication lines 16. Additional network devices, such as devices 24 and 26 comprising a second jurisdiction 28 and devices 30 and 32 comprising a third jurisdiction 34, may also communicate via the communication lines 16.

A monitoring tool 40 is also provided for monitoring any one or more of the plurality of communication lines 16 between the network 12 and the external network 14. Specifically, the monitoring tool 40 may monitor communications leaving the network 12. The monitoring tool 40 may scan outgoing communications, such as, for example, email (messages and/or attached documents), instant messages, web postings, file transfers, voice over internet, and others, to detect a communication event, such as, for example, a violation of a security policy. Additionally, it may be desirable to monitor communications coming into the network 12.

For a network that spans a large area, such as a global network, there may be locations or jurisdictions within the network that have laws or regulations that forbid the monitoring of network communications. The system and method of the present disclosure provide a means for determining the origin of network communications and, thereafter, monitoring only network communications originating from jurisdictions that permit monitoring. A third class of jurisdictions may be uncertain as to whether monitoring is permitted. Whether a jurisdiction forbids, permits, or is uncertain regarding monitoring may be determined in a customary manner, such as via a corporate legal department finding.

Figure 3:
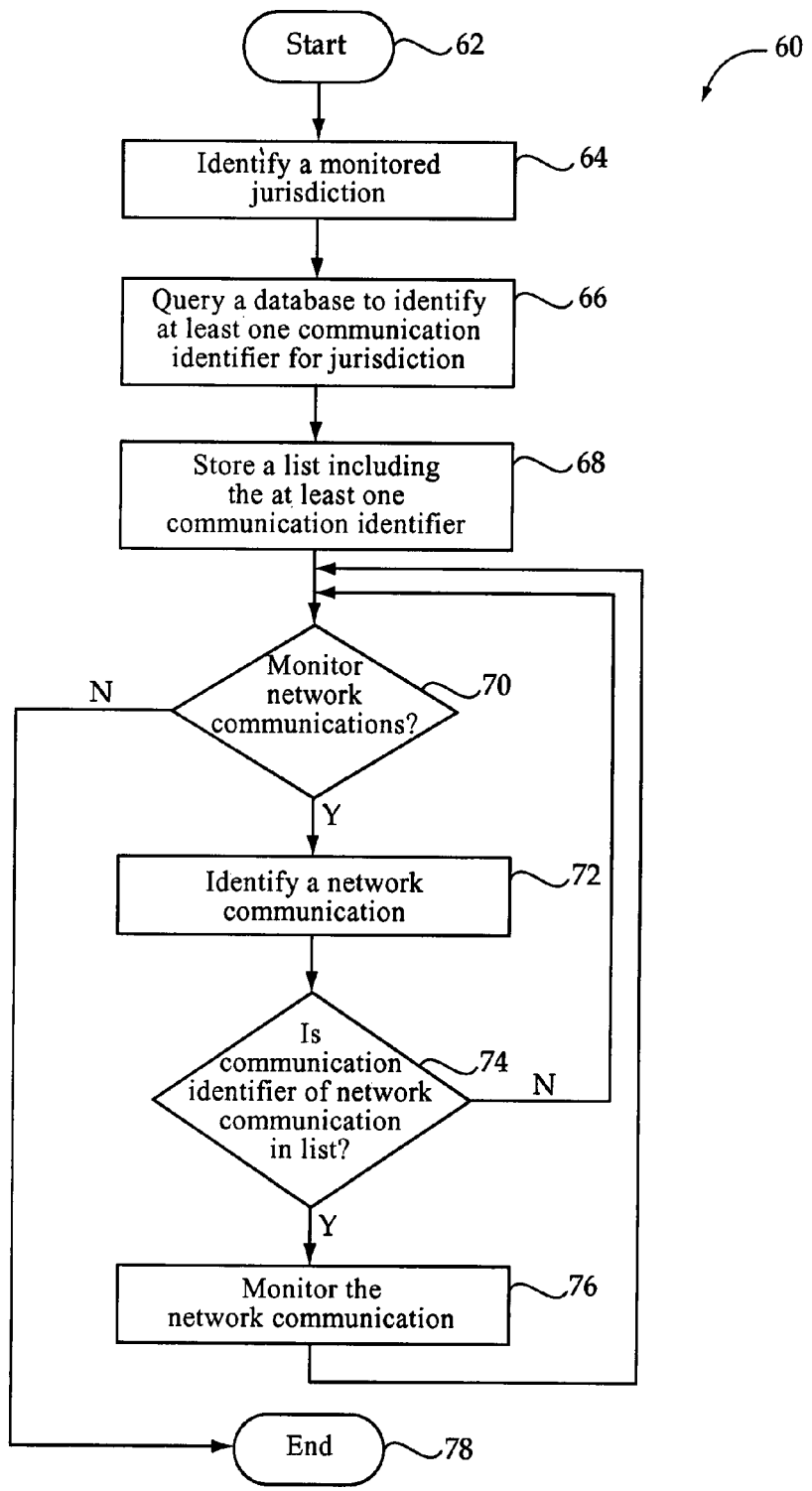

Turning specifically to FIG. 3, there is shown a flow chart 60 representing an exemplary method of monitoring network communications originating in monitored jurisdictions. The method may be implemented in whole, or in part, by the monitoring tool 40 and process 42. For example, the steps implementing the disclosed method may be stored in memory and executed by the processor 42 and any additional processors of the monitoring tool 40. Alternatively, the method may be implemented using a network based application that can be stored on any machine or server and may be called up and manipulated from any location. In a further embodiment, the method may be implemented through a software agent stored on predetermined machines, servers, and workstations, such as network devices 18, 20, 24, 26, 30, or 32, connected to the network 12. Although only one monitoring tool 40 is shown, it should be appreciated that several instances of the monitoring tool 40 may be implemented throughout the system 10.

The method begins at a START, Box 62. From Box 62, the method proceeds to Box 64, which includes the step of identifying a monitored jurisdiction. A monitored jurisdiction, such as, for example, first jurisdiction 22, may be identified, based on predetermined criteria, manually or may be selected electronically from a database or repository listing jurisdictions to be monitored. First jurisdiction 22 may represent a jurisdiction, such as, for example, a country, that allows the monitoring of network communications, whereas second jurisdiction 28 and third jurisdiction 34 represent locations, or countries, that forbid the monitoring of network communications. It should be appreciated that there may exist jurisdictions in which the regulations are unclear regarding monitoring and, therefore, a decision must be made regarding how to categorize the jurisdiction. After monitored jurisdictions and unmonitored jurisdictions have been identified at Box 64, the method proceeds to Box 66.

At Box 66, the monitoring tool 40 or, more specifically, the process 42 queries at least one database to identify at least one communication identifier for each monitored jurisdiction, namely first jurisdiction 22. For example, it may be desirable to reference subnetwork database 36 to select communication identifiers 50 associated with first jurisdiction 22. Communication identifiers 50, according to this example, may include IP addresses, such as IP address 52. It may also be desirable to reference contact database 38 to select communication identifiers 50 associated with first jurisdiction 22. Communication identifiers 50 from contact database 38 may include email addresses, such as email address 54. It should be appreciated that only one type of communication identifiers 50 may be selected or numerous types of communication identifiers may be identified.

At Box 68, a list 44 is created and/or provided that includes the one or more types of communication identifiers 50 identified at Box 66. From Box 68, the method proceeds to Box 70, where the monitoring tool 40 determines if network communications are to be monitored. It should be appreciated that this querying step may not be necessary if the monitoring tool 40 is configured to continually monitor network communications. If, however, it is determined, at Box 70, that network communications are to be monitored, a specific network communication may be identified at Box 72. A network communication may, for example, include an email message, instant message, web posting, file transfer, voice over internet, or any other known network communication.

Once a network communication has been identified, the method proceeds to Box 74, where the monitoring tool 40 determines if a communication identifier associated with the communication is identified in the list 44. If, for example, an email based network communication is identified with a sender of "jsmith@network12.com," it can be determined, by referencing the list 44, that the communication originated from a monitored jurisdiction, namely, first jurisdiction 22. If, however, an email communication is identified with a sender of "mjones@network12.com," it can be determined that the communication originated in an unmonitored jurisdiction, since the communication identifier 50 is not identified in the list 44. For a non-email communication or network address based communication, such as, for example, a file transfer, it may be desirable to determine if the associated IP address is identified in the list 44 to determine whether or not to monitor the communication.

If the communication identifier is identified in the list 44, the method proceeds to Box 76 and the network communication is monitored. If, however, the communication identifier is not identified in the list 44, the method returns to Box 70 to determine if communications are still to be monitored. If communications are not to be monitored, the method proceeds to an END, at Box 78. If communications are to be continually monitored, it should be appreciated that for each identified network communication a communication identifier associated with the communication will be compared to the list 44 to determine whether or not to monitor the communication. It should also be appreciated that this determination may be made instantaneously, or near instantaneously.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of monitoring network communications in a computer network having a plurality of network devices, wherein the computer network is divided into a plurality of jurisdictions each having at least one of the plurality of network devices, and each of the network devices is disposed in only one of the jurisdictions, and wherein the computer network has a monitoring tool connecting the computer network to an outside network, the method comprising:

identifying a monitored jurisdiction within the computer network based on predetermined criteria, wherein the computer network includes at least one monitored jurisdiction and at least one unmonitored jurisdiction;

querying a database to identify at least one communication identifier associated with the monitored jurisdiction, wherein each communication on the computer network includes a communication identifier, and each communication identifier includes identifying information associating the communication identifier with one of the jurisdictions of the computer network;

creating a list including the at least one communication identifier;

storing the list including the at least one communication identifier;

receiving at the monitoring tool outgoing communications from the plurality of network devices being transmitted from the computer network to the outside network;

for each outgoing communication, comparing the communication identifier in the outgoing communication to the list of communication identifiers of the monitored jurisdiction; and monitoring only outgoing communications having communication identifiers included in the list of communication identifiers of the monitored jurisdiction, the monitoring comprising scanning content of the outgoing communication for a violation of a security policy.

2. The method of claim 1, wherein the identifying step includes identifying a jurisdiction having a regulation permitting monitoring of communications and identifying a jurisdiction having regulations forbidding monitoring of communications.

3. The method of claim 2, wherein the identifying step includes identifying a jurisdiction having an uncertain regulation regarding monitoring of communications.

4. The method of claim 2, wherein the identifying step is repeated at a predetermined frequency.

5. The method of claim 1, wherein a communication identifier may be a network address corresponding to a network device, and wherein the querying step includes querying at least one database to identify a network address associated with the monitored jurisdiction.

6. The method of claim 5, wherein a communication identifier may be an email address corresponding to a user of the computer network, and wherein the monitoring step includes monitoring network address based network communications leaving the computer network.

7. The method of claim 1, wherein the querying step includes querying at least one database to identify an email address associated with the monitored jurisdiction.

8. The method of claim 7, wherein the monitoring step includes monitoring email address based network communications leaving the computer network.

9. The method of claim 1, wherein the querying step, the storing step, and the monitoring step are repeated on a daily basis.

10. The method of claim 1, wherein the monitoring step includes identifying network communication events within the network communications.

11. A system for monitoring network communications, comprising:

a computer network with portions located in at least one monitored jurisdiction and at least one unmonitored jurisdiction, wherein the monitored jurisdiction is identified based on predetermined criteria, wherein the computer network includes a plurality of network devices, wherein each jurisdiction of the computer network includes at least one of the plurality of network devices, and wherein each of the network devices is disposed in only one of the jurisdictions;

at least one database having at least one communication identifier associated with the monitored jurisdiction, wherein each communication on the computer network includes a communication identifier, and each communication identifier includes identifying information associating the communication identifier with one of the jurisdictions of the computer network;

a process for creating and storing a list including the at least one communication identifier associated with the monitored jurisdiction; and a monitoring tool for monitoring only network communications having communication identifiers included in the list, wherein the monitoring tool connects the computer network to an outside network, the monitoring tool being configured to receive outgoing communications from the plurality of network devices being transmitted from the computer network to the outside network, the monitoring tool being configured to compare the communication identifier in each outgoing communication to the list of communication identifiers for the monitored jurisdiction, and the monitoring tool being configured to monitor only outgoing communications having communication identifiers included in the list of communication identifiers of the monitored jurisdictions, wherein monitoring comprises scanning content of the outgoing communication for a violation of a security policy.

12. The system of claim 11, wherein the predetermined criteria include a regulation permitting monitoring of communications.

13. The system of claim 11, wherein the communication identifier includes a network address associated with the monitored jurisdiction.

14. The system of claim 13, wherein the network communications include network address based network communications leaving the computer network.

15. The system of claim 11, wherein the communication identifier includes an email address associated with the monitored jurisdiction.

16. The system of claim 15, wherein the network communications include email address based network communications leaving the computer network.

17. The system of claim 11, wherein the monitoring tool is configured to identify network communication events within the network communications.

18. The method of claim 1, wherein for situations in which regulations are unclear regarding monitoring of communications for a jurisdiction, deciding a categorization for the jurisdiction for monitoring.

19. The system of claim 11, wherein for situations in which regulations are unclear regarding monitoring of communications for a jurisdiction, the monitoring tool comprising categorizing the jurisdiction for monitoring.

\* \* \* \* \*